United States Patent [19]
Angibaud

[11] 3,843,083
[45] Oct. 22, 1974

[54] MOUNTING APPARATUS FOR PORTABLE DEVICE
[75] Inventor: René M. Angibaud, Vernon, France
[73] Assignee: Societe Les Piles Wonder, Saint Ouen, France
[22] Filed: Oct. 29, 1973
[21] Appl. No.: 410,554

[30] Foreign Application Priority Data
Nov. 9, 1972 France .............................. 72.39751

[52] U.S. Cl............ 248/229, 248/74 R, 248/226 D, 248/230, 248/316 C, 403/90
[51] Int. Cl. ....................... F16b 2/00, F21l 15/00
[58] Field of Search ....... 248/229, 288, 226 D, 230, 248/41, 316 C, 316 R, 68 CB, 74 R, 68 R; 403/90, 344

[56] References Cited
UNITED STATES PATENTS
| 926,114 | 6/1909 | Hall | 248/230 |
| 1,227,258 | 5/1917 | Godley | 248/229 |
| 1,303,345 | 5/1919 | McFeaters | 248/74 R X |
| 1,888,342 | 11/1932 | Anderson | 248/68 R |
| 3,146,982 | 9/1964 | Budnick | 248/229 X |

FOREIGN PATENTS OR APPLICATIONS
555,478  1/1957  Italy .................................. 248/229

Primary Examiner—Roy D. Frazier
Assistant Examiner—Robert W. Gibson, Jr.
Attorney, Agent, or Firm—Roylance, Abrams, Berdo & Kaul

[57] ABSTRACT

A mounting apparatus having a bracket to fit the article to be held, a ball on the bracket, a socket formed by spherical recesses in two jaws to mate with and clamp the ball and a collet formed by cylindrical recesses in the jaws to clamp a support member. Each jaw has longitudinal reinforcing ribs and a central opening between the ribs through which a threaded fastener extends. The opening is tapered in the general shape of a frustum having an oval base at the outer surface. The outer surface surrounding the opening is convex and spherical. The threaded fastener includes a washer having a concave spherical surface, a bolt with an hexagonal head which fits between the ribs which then prevent rotation. A butterfly nut holds the assembly together.

4 Claims, 7 Drawing Figures

PATENTED OCT 22 1974 3,843,083
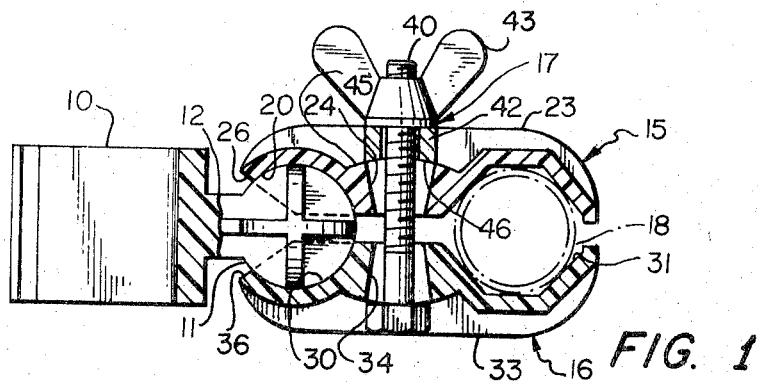
FIG. 1
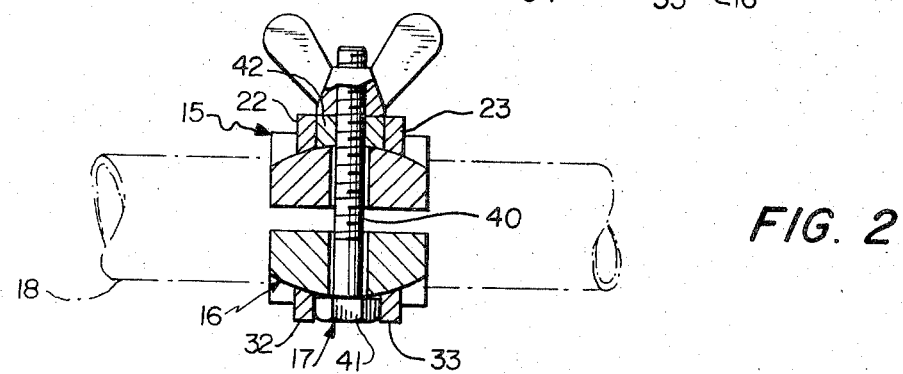
FIG. 2
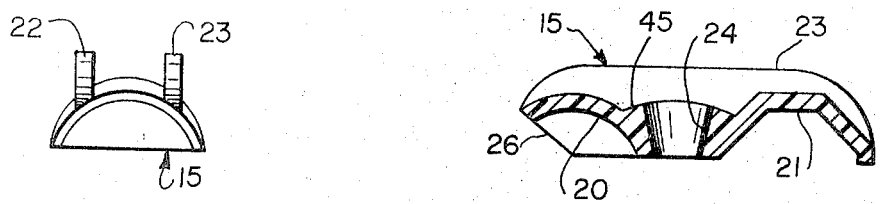
FIG. 3
FIG. 4
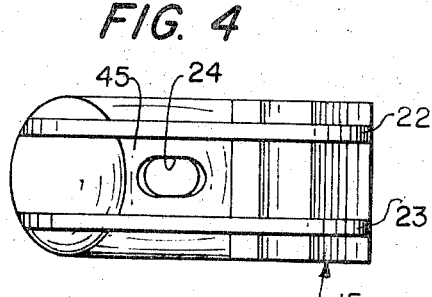
FIG. 5
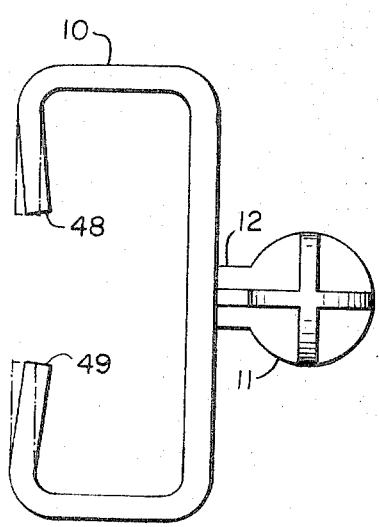
FIG. 7
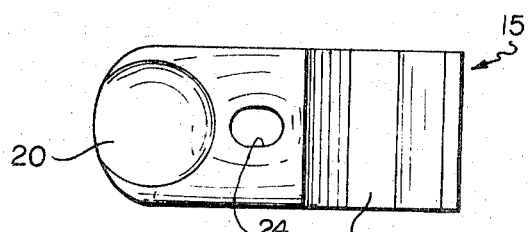
FIG. 6

MOUNTING APPARATUS FOR PORTABLE DEVICE

This invention relates to an apparatus for mounting a portable device on a fixed support and, particularly, to an adjustable mounting apparatus particularly for a lighting device.

It is well known to provide a mounting device for a small lamp or similar lighting device in which there is some form of ball and socket swivel so that the light can be adjusted to suit the user and so that the light and its associated mount can be attached to a convenient support. Such devices have commonly been provided with spring clips mounting apparatus or other, more specialized mounts.

A common shortcoming in the holding mechanisms provided on portable lighting devices has been that they do not allow afixing the devices to supports of various kinds. Thus, for example, it is practically impossible to afix a portable lantern to the handle bar of a bicycle or to the stake of a tent without the utilization of supplementary makeshift ties or the like.

In addition, it is generally difficult with such prior art devices to direct and immobilize the light source in a desired orientation.

An object of the present invention is to provide a mounting apparatus for portable apparatus, such as a light, wherein the apparatus can be readily adjusted to permit universal orientation of the device with respect to the support.

A further object is to provide an apparatus which firmly clamps a portable device to a support, particularly one of rounded shape, without flexibility limitation.

Briefly described, the adjustable mounting apparatus of the present invention includes a mounting bracket for engaging a portable device, a ball fixedly attached to the bracket, and clamping means for partially surrounding the ball and a portion of the support to hold the ball in any one of a plurality of possible orientations relative to the support. The clamping means includes a pair of substantially identical jaw members each of which is formed with a spherically shaped recess dimensioned to mate with a portion of the ball, a generally cylindrically shaped recess which faces in the same general direction as the spherical recess in an inward direction, longitudinal reinforcing ribs on the outer or back surface of each jaw, means defining a central opening between the ribs through which a fastener can pass, and a convex surface portion around the opening and between the ribs. The clamping means further includes a threaded fastener for retaining the jaw members in inwardly facing relationship to clamp the ball between the spherical recesses and to clamp the support between the cylindrical recesses, the fastener including a washer having a concave surface for mating with the convex surface of one of the jaw members, a nut, and a bolt having flat portions engagable with the ribs on the other jaw member to prevent rotation thereof when the nut is threaded thereon. The mounting bracket constitutes an open, generally C-shaped frame corresponding in shape to the exterior of a portion of the housing of the device to be supported. The distal ends of the frame are curved inwardly to grip the housing. In addition, each opening through which the threaded fastener can pass is in the shape of a frustum of a generally oval body with the base, or larger, portion thereof facing outwardly to accomodate support members of various sizes.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a side elevation in section showing the apparatus of the present invention in assembled form;

FIG. 2 is a vertical section along lines 2—2 of FIG. 1;

FIGS. 3–6 are front, side, top and bottom views of one jaw of the apparatus of FIGS. 1 and 2, FIGS. 3 and 4 being sectional views; and FIG. 7 is a plan view of the bracket and ball structure of the apparatus of FIG. 1.

Turning now to the drawings in detail, it will be seen that the FIG. 1 shows a bracket 10 which constitutes a generally rectangular, C-shaped body of molded plastic having a spherical member 11 formed integrally therewith and connected thereto by a neck portion 12. Member 11 will be referred to hereinafter as a ball although it is recognized that the ball need not have a continuous spherical surface and, indeed, does not in the embodiment disclosed herein. However, the ball constitutes a plurality of rib members each of which lies in the plane of a sphere, there being a sufficient number of ribs to define a body which acts as a sphere for purposes of a structure such as that disclosed.

The clamping apparatus further comprises an upper jaw indicated generally at 15, a lower jaw indicated generally at 16 and a threaded fastener indicated generally at 17, these, in conjunction with the bracket and ball structure, constituting the major portions of the clamping structure. A support to which the apparatus can be connected is indicated in phantom as a tube 18, although the support can conveniently take any one of a large variety of possible shapes.

The details of the structure will be hereinafter discussed with general reference to FIGS. 1 and 2, which show the apparatus assembled, and FIGS. 3–6 which show isolated views of each jaw. FIGS. 3–6 are numbered identically with upper jaw 15. It will be observed that upper jaw 15 includes a lower surface having a downwardly facing spherically shaped recess 20 and a downwardly facing cylindrically shaped recess 21 at opposite ends of the jaw with the two recesses facing in approximately the same direction. It will also be observed that recess 21 is termed a cylinder in the broader sense of constituting a surface formed by three planar surfaces. The purpose of this arrangement is so that the recess can easily mate with and provide gripping contact with support members of various sizes and shapes. At least two lines of contact exist with any support member reasonably approximating the dimensions of the recess.

Jaw 15 also includes an upper surface having two upstanding parallel ribs 22 and 23 and an opening 24 which extends through the body in a transverse direction perpendicular to a plane lying generally between the two jaws in their assembled form. Opening 24 receives fastener 17 and is shaped in a specific way to permit maximum flexibility in the support members to which the apparatus can be attached. It will be observed that opening 24 is generally oval or elliptical in shape and also is tapered to form a frustum having a generally oval base. With this arrangement, the jaws can be placed around a support body which is substantially larger than support member 18 so that the jaws are no longer parallel but are, instead, substantially farther apart at the ends defining recesses 21 than at the ends defining recesses 20. The fastener then extends through opening 24 at an angle which is permitted by the tapered form of the opening. It will also be observed from FIGS. 5 and 6 that the opening is elongated in the longitudinal direction of the body only. It will also be observed that the end of the body including recess 20 is terminated in a tapered surface 26 to prevent interference between the ends of the jaw portions and neck portion 12 when the other ends of the jaw are separated by a larger support body as just described.

Lower jaw 16 similarly comprises a spherically shaped recess 30, a cylindrical recess 31, formed by a plurality of intersecting planar surfaces, parallel ribs 32 and 33 and a tapered opening 34 having the same frustum shape as described with reference to opening 24. The end of body 16 near the spherical recess is also provided with a beveled surface 36 similar to surface 26 to prevent here interference with neck portion 12.

Fastener 17 constitutes a conventional externally threaded hexagonal head bolt 40, the head 41 of which is selected to be approximately equal to the spacing between inwardly facing inner surfaces of ribs 22 and 23 or, as shown in FIGS. 1 and 2, ribs 32 and 33 so that the bolt head will be in substantially contiguous relationship with the inner surfaces thereof when the bolt is inserted through openings 34 and 24, thereby preventing rotational motion of the bolt. A washer 42 is placed over the threaded end of the bolt and a butterfly nut 43 is threaded thereon, thereby clamping the jaw members together and snuggly retaining ball 11 and support 18 therebetween. Loosening the butterfly nut permits adjustment of the assembly around support member 18 and adjustment in a universal joint type of motion of the bracket 10.

It will be observed that the portion of the outer surface of jaw 15 in the vicinity of opening 24 constitutes a convex generally spherically shaped portion 45 and that the inwardly facing surface 46 of nut 42 is provided with a similar and mating concave shape. It will also be observed that the outer diameter of washer 42 is smaller than the diametral measurements of surface 45 so that lateral motion with respect to that surface of threaded member 17 and its associated washer is permitted. This mating curvature permits rigid clamping of the two members regardless of the angular relationship of the threaded member to the jaw members, within reasonable limits. There are no unresolved stresses which would tend to alter the position of the support after it has been clamped on a specific support apparatus.

Turning now to FIG. 7, the specific arrangement of the bracket portion will be described. It will be observed that the bracket is illustrated in the shape of an elongated triangle having a side opening, but it must be emphasized that this is merely exemplary and that the bracket can be formed in any manner depending upon the type of lamp, lantern or other device to be attached thereto.

A significant feature of bracket 10, however, is that it constitutes a split structure having an opening defined by end portions 48 and 49, which end portion are intentionally formed in a manner which causes some inward distortion beyond the outline of the housing of the apparatus to be held. The bracket structure is advantageously produced from a plastic, as by pressure or injection molding, resulting in a structure which, because of the material and also because of the form as shown in FIG. 7, has a certain amount of elasticity. Inserting the housing thus distorts ends 48 and 49 outwardly, as indicated by the phantom lines, the memory of the material being sufficient to provide additional gripping force.

While the apparatus disclosed herein can be produced from any material or any combination of materials, it will be recognized that the relatively complicated surface formations disclosed herein are most advantageously produced by plastic molding procedures.

It will be noted that, while the ball 11 can be made in a solid form it is more advantageously formed with orthogonally related ribs or discs, as shown, leaving the intervening octants vacant. This facilitates removal of the ball from the jaws.

While one advantageous embodiment has been chosen to illustrate the invention it will be understood by those skilled in the art that various changes and modifications can be made therein without departing from the scope of the invention as defined in the appended claims.

What is claimed is:

1. An improved adjustable mounting apparatus for adjustably mounting a portable device on a support, comprising
   a mounting bracket for engaging the portable device;
   a ball fixedly attached to said bracket; and
   clamping means for partially surrounding said ball and a portion of the support and for holding the ball in a plurality of orientations relative to the support, said clamping means including
   first and second substantially identical jaw members each having
      a spherically shaped recess dimensioned to mate with a portion of said ball;
      a generally cylindrically shaped recess, the recesses opening toward a common plane;
      longitudinal reinforcing ribs;
      means defining a transverse central opening, between said ribs and perpendicular to said plane, through which a fastener can pass; and
      a convex surface portion around said opening and between said ribs; and
   threaded fastener means for retaining said jaw members in facing relationship to clamp said ball between said spherical recesses and said support between said cylindrical recesses,
   said fastener means including a washer having a concave surface for mating with the convex surface of one of said jaw members,
   a nut; and
   a bolt having flat portions engagable with the ribs on the other one of said jaw members to prevent rotation thereof when said nut is threaded thereon.

2. Apparatus according to claim 1 and wherein
   said mounting bracket comprises an open frame corresponding in shape to the exterior of a portion of the housing of the device to be supported,
   and wherein the distal ends of said frame are curved inwardly.

3. An apparatus according to claim 1 wherein each said means defining a transverse central opening defines a frustum having an elongated, generally oval base.

4. An apparatus according to claim 1 wherein said cylindrical recess is formed by a plurality of intersecting planar surfaces.

* * * * *